US007929243B2

(12) United States Patent
Bui et al.

(10) Patent No.: US 7,929,243 B2
(45) Date of Patent: Apr. 19, 2011

(54) SETTING EDGE STRESS SIGNAL IN MAGNETIC TAPE DATA STORAGE CARTRIDGE MEMORY IN RESPONSE TO SERVO DETECTION ERROR SIGNALS

(75) Inventors: Nhan Xuan Bui, Tucson, AZ (US); Reed Alan Hancock, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 12/367,315

(22) Filed: Feb. 6, 2009

(65) Prior Publication Data
US 2010/0202083 A1   Aug. 12, 2010

(51) Int. Cl.
*G11B 5/584* (2006.01)
(52) U.S. Cl. .................................................... 360/77.12
(58) Field of Classification Search ............... 360/77.12, 360/78.02, 40, 42, 72.2, 130.21, 134, 69; 714/25; 713/600
See application file for complete search history.

(56) References Cited

U.S. PATENT DOCUMENTS

| 3,012,230 | A | * | 12/1961 | Galas et al. ................. 713/600 |
| 3,536,194 | A | * | 10/1970 | Novak ........................... 209/610 |
| 3,761,906 | A | * | 9/1973 | Finster et al. .................. 360/42 |
| 4,007,355 | A | * | 2/1977 | Moreno ........................ 235/379 |
| 4,964,557 | A | * | 10/1990 | Sarkisian et al. ............. 242/357 |
| 5,613,082 | A |  | 3/1997 | Brewet et al. ................. 395/404 |
| 5,883,770 | A | * | 3/1999 | Biskeborn et al. ....... 360/130.21 |
| 6,341,416 | B1 | * | 1/2002 | Biskeborn et al. ......... 29/603.12 |
| 6,425,042 | B1 |  | 7/2002 | Ikeda et al. ...................... 711/4 |
| 6,621,650 | B1 |  | 9/2003 | Takayama ...................... 360/69 |
| 6,690,531 | B2 | * | 2/2004 | Richards et al. .............. 360/72.2 |
| 6,865,045 | B2 |  | 3/2005 | Kuriyama et al. .............. 360/60 |
| 6,947,237 | B2 |  | 9/2005 | Christie, Jr. ..................... 360/60 |
| 7,158,338 | B2 | * | 1/2007 | Koski et al. ................ 360/77.12 |
| 7,193,803 | B2 |  | 3/2007 | Jaquette ......................... 360/69 |
| 7,245,453 | B2 | * | 7/2007 | Koski et al. ................ 360/77.12 |
| 7,277,246 | B2 |  | 10/2007 | Barbian et al. ................. 360/69 |
| 7,372,655 | B2 |  | 5/2008 | Honjo et al. .................... 360/69 |
| 7,522,371 | B2 | * | 4/2009 | Koski et al. ................ 360/77.12 |
| 7,522,372 | B2 | * | 4/2009 | Koski et al. ................ 360/77.12 |
| 2006/0203373 | A1 |  | 9/2006 | Dahman et al. ................. 360/69 |
| 2007/0067678 | A1 | * | 3/2007 | Hosek et al. .................... 714/25 |
| 2008/0170330 | A1 |  | 7/2008 | Asano ........................... 360/132 |
| 2010/0079890 | A1 | * | 4/2010 | Brummet ........................ 360/40 |

* cited by examiner

*Primary Examiner* — Fred Tzeng
(74) *Attorney, Agent, or Firm* — John H. Holcombe

(57) ABSTRACT

Methods, magnetic tape data storage drives, data storage systems, and magnetic tape data storage cartridges. A system having at least one magnetic tape data storage drive is configured to handle a magnetic tape cartridge comprising a magnetic tape data storage media and accompanying cartridge memory. The magnetic tape media comprises a plurality of longitudinal servo bands, the servo bands separated by data bands. Two servo bands, each at opposite sides of a data band are sensed. In response to at least one servo detection error signal of one of the two servo bands, an edge stress signal is set to the cartridge memory of the magnetic tape cartridge. Then, for example, after reloading the cartridge, the cartridge memory is inspected for a set edge stress signal; and, if the edge stress signal is set, only read operations are allowed with respect to the inspected magnetic tape data storage cartridge.

22 Claims, 9 Drawing Sheets

SETTING EDGE STRESS SIGNAL IN MAGNETIC TAPE DATA STORAGE CARTRIDGE MEMORY IN RESPONSE TO SERVO DETECTION ERROR SIGNALS

DOCUMENTS INCORPORATED BY REFERENCE

Commonly assigned U.S. Pat. No. 5,689,384, Albrecht et al., and commonly assigned U.S. Pat. No. 6,903,895, Chliwnyj et al., are incorporated for their showing of magnetic tape servo systems.

FIELD OF THE INVENTION

This invention relates to magnetic tape data storage, and, more particularly, to handling magnetic tape data storage media.

BACKGROUND OF THE INVENTION

Magnetic tape data storage media provides a means for storing large amounts of data, and typically comprises an elongate media with plurality of data tracks that extend longitudinally along the tape. A tape head is employed for reading and/or writing data on the data tracks, and is typically shared between various parallel sets of data tracks in one or more data bands. The tape head is moved between sets of tracks and data bands in the lateral direction of the tape. The tape head typically comprises a number of separate elements which read and/or write data with respect to a set of tracks comprising number of parallel data tracks, and is associated with separate servo sensors, which are laterally offset to either side from the read and/or write elements.

The magnetic tape media is typically very thin in order to accommodate a greater length of tape on a cartridge reel, and thereby store a large amount of data. Additionally, the data tracks are each narrow and are spread across the tape to maximize the amount of data stored in a given length of magnetic tape media.

The magnetic tape media typically provides servo tracks between bands of parallel data tracks and at the outside edges of the tape, so that a servo system can access a set of data tracks within a band of tracks intermediate two servo tracks, and can track the set of data tracks despite lateral movements of the magnetic tape.

After repeated usage of the very thin media, the edge of tape can become weakened and slightly stressed. When this happens the edge of the tape can become slightly stretched or worn, and may affect the readability of the servo and data tracks near the edge. A write operation may require that both the top and bottom servo signals be valid, and if the readability of the servo track at an edge is adversely affected to the extent that error recovery procedures do not allow the write operation to continue, the write operation may be aborted as having a permanent write error.

SUMMARY OF THE INVENTION

Methods, magnetic tape data storage drives, data storage systems, and magnetic tape data storage cartridges are provided.

In one embodiment, in a system comprising at least one magnetic tape data storage drive configured to handle at least one magnetic tape data storage cartridge comprising a magnetic tape data storage media and accompanying cartridge memory, the magnetic tape data storage media comprising a plurality of servo bands extending in a longitudinal direction of the magnetic tape data storage media, the servo bands separated by data bands. Two servo bands, each at opposite sides of a data band, of the cartridge magnetic tape data storage media, are sensed. In response to at least one servo detection error signal of one of the two servo bands of the sensing step, an edge stress signal is set to the accompanying cartridge memory of the magnetic tape data storage cartridge. The cartridge memory of a magnetic tape data storage cartridge is inspected for a set edge stress signal; and, if the edge stress signal is set, normal write operations are prevented such that only read operations are allowed with respect to the inspected magnetic tape data storage cartridge.

In a further embodiment, the inspection for the edge stress signal is conducted subsequent to unloading and reloading the magnetic tape data storage cartridge in the magnetic tape data storage drive.

In a still further embodiment, additionally if the edge stress signal is set, the drive detects whether the bottom servo band is being sensed, and, if so, responds to at least one servo detection error signal of the sensed bottom servo band to increase tension of the magnetic tape data storage media during reading of a bottom data band.

In another embodiment, a cartridge memory of a magnetic tape data storage cartridge is inspected for a set edge stress signal, the edge stress signal indicating at least one sensed servo detection error signal of one of two servo bands, the servo bands each at opposite sides of a data band, of the magnetic tape data storage media of the cartridge; if the edge stress signal is set, normal write operations are prevented such that only read operations are allowed with respect to the inspected magnetic tape data storage cartridge; and if no edge stress signal is set, both read and write operations are allowed with respect to the inspected magnetic tape data storage cartridge.

In still another embodiment, during operation of the magnetic tape data storage drive with respect to a magnetic tape data storage media of a magnetic tape data storage cartridge, the drive senses two servo bands, each at opposite sides of a data band, of the magnetic tape data storage media; and responds to at least one servo detection error signal of one of the two servo bands of the sensing step, to set an edge stress signal to the accompanying cartridge memory of the magnetic tape data storage cartridge.

In still another embodiment, as a part of sensing at least one error detection signal, sensing the bottom servo band for servo detection error signals, and, as a part of responding to the servo detection error(s), responding to the servo detection error signal of the bottom servo band, to set the edge stress signal.

In another embodiment, the magnetic tape data storage media is moved to the end of tape, and a servo of the drive is positioned to allow detection of the bottommost data of the bottom data band to sense the bottommost servo position of the bottom servo band.

In another embodiment, a magnetic tape data storage cartridge comprises an elongate magnetic tape data storage media having a plurality of servo bands extending in a longitudinal direction of the magnetic tape data storage media, the servo bands separated by data bands, the servo bands employed by a servo system of a magnetic tape to provide servo signals to control the lateral positioning of at least one read/write head based on the servo signals, and to sense errors of the servo bands. The cartridge further comprises a cartridge memory comprising a storage location configured to store any set edge stress signal, the edge stress signal indicating at least one sensed servo detection error signal of one of two servo bands, the servo bands each at opposite sides of a data band, of the elongate magnetic tape data storage media.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
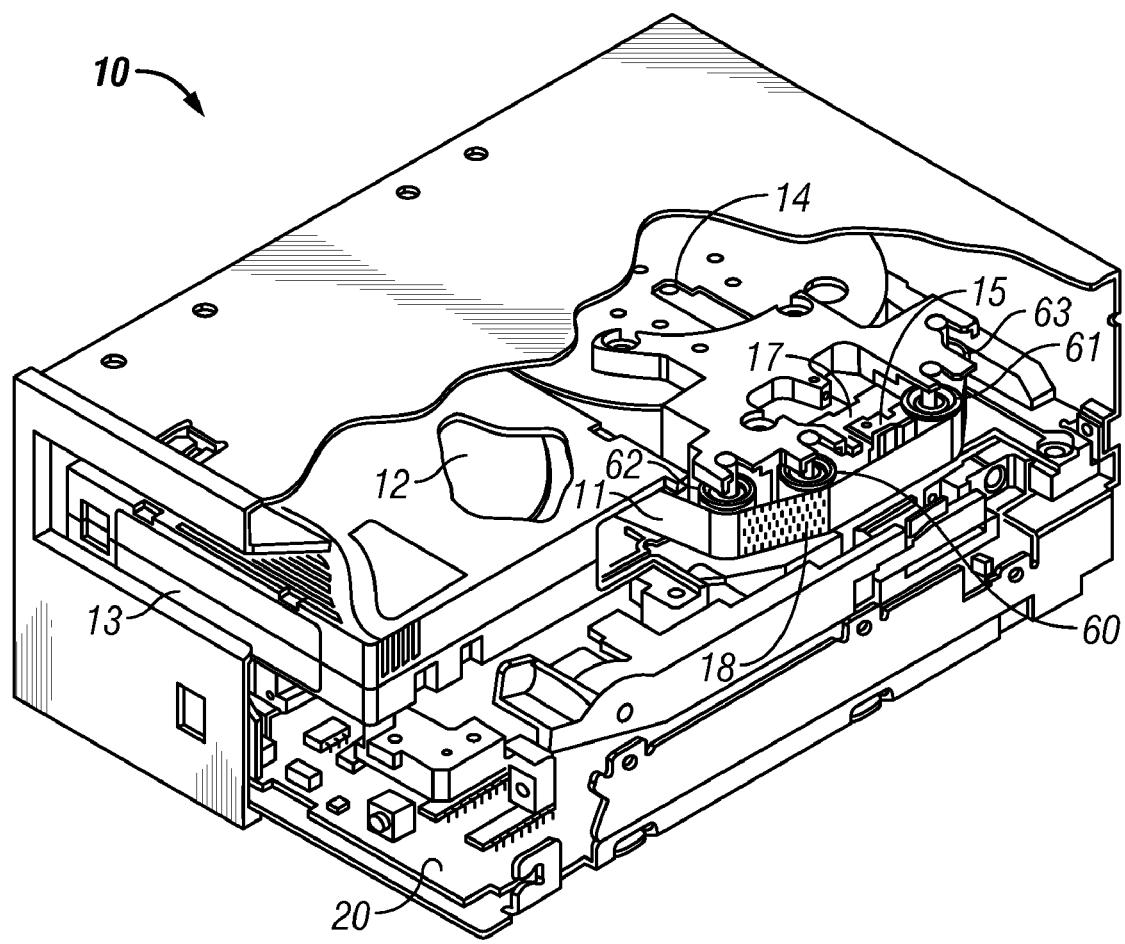
FIG. 1 is a partially cut away view of a magnetic tape drive, with a magnetic tape data storage cartridge, implementing the present invention.
Figure 2:
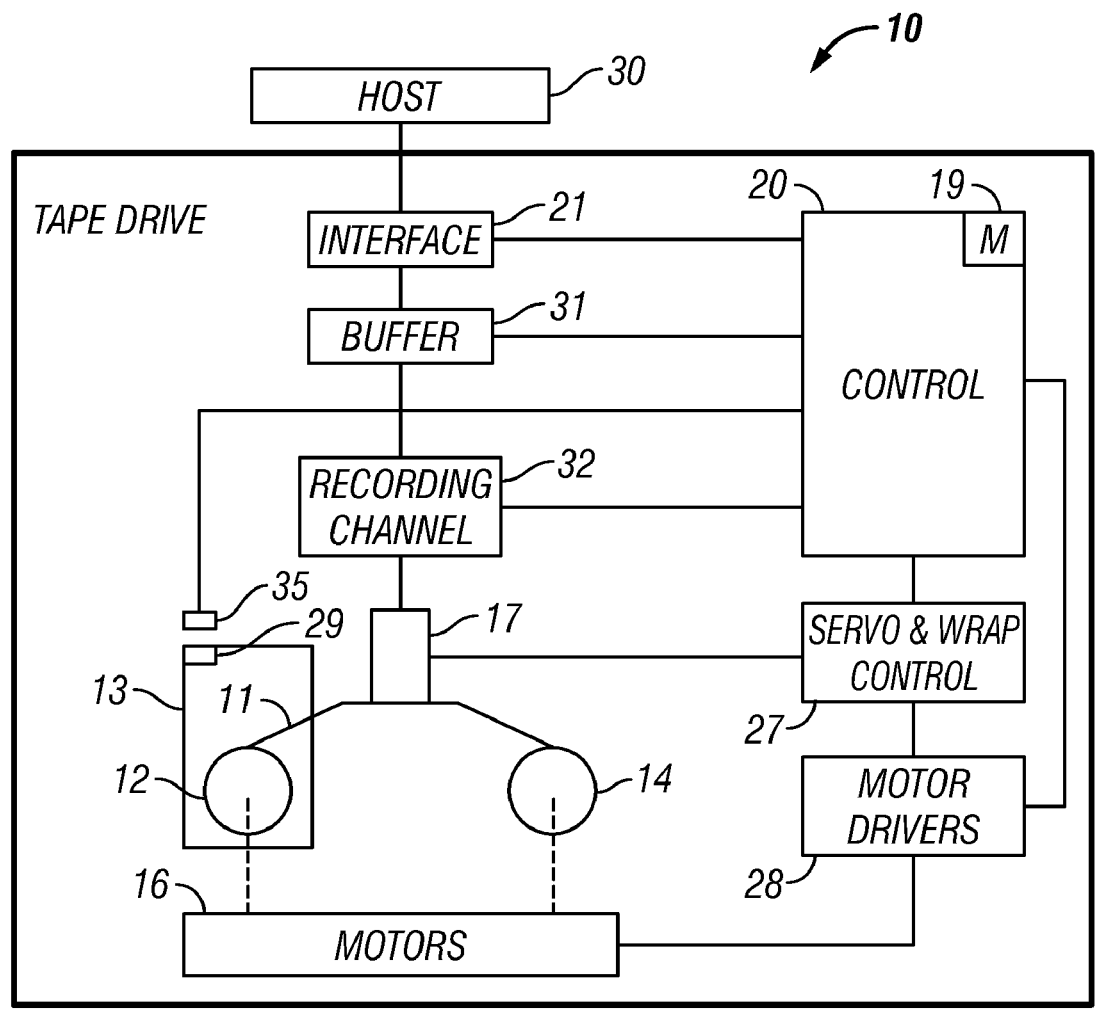
FIG. 2 is a block diagram of the magnetic tape drive of FIG. 1.

FIGS. 1 and 2 illustrate a magnetic tape data storage drive 10 which writes data 18 to and reads data from magnetic tape data storage media 11. As is understood by those of skill in the art, magnetic tape data storage drives, also called magnetic tape drives or tape drives, may take any of various forms. The illustrated magnetic tape drive 10 translates the magnetic tape 11 along a tape path in the longitudinal direction of the tape from a supply reel 12 in a magnetic tape data storage cartridge 13 to a take up reel 14, the reels comprising drive reels of a tape drive system which are operated by drive motors 16. An example of a magnetic tape drive is the IBM® LTO (Linear Tape Open) magnetic tape drive. Another example of a magnetic tape drive is the IBM® TotalStorage Enterprise magnetic tape drive. Both the above examples of magnetic tape drives employ single reel tape cartridges 13. An alternative magnetic tape drive and magnetic tape cartridge is a dual reel cartridge and drive in which both reels 12 and 14 are contained in the cartridge.

The magnetic tape media 11 is moved in the longitudinal direction across a tape head 15. The tape head may be supported and laterally moved by an actuator 17 of a track following servo system 27. The magnetic tape media is supported by roller tape guides 60, 61, 62, 63, which may or may not be flanged, while motor drivers 28 operate the motors 16 to move the magnetic tape media longitudinally. The drive motors are operated at various speeds as controlled by the motor drivers 28 to insure that the magnetic tape media leaves one reel at the same speed that it is wound onto the other reel. The motor drivers 28 also control the torque applied to each drive motor 16 to control the tension applied to the magnetic tape media at the tape head 15.

The magnetic tape data storage cartridge 13 typically comprises a cartridge memory 29 that stores information relating to the cartridge and its content. The cartridge memory is read and written to by a cartridge wireless transponder 35, as is known to those of skill in the art.

Figure 3:
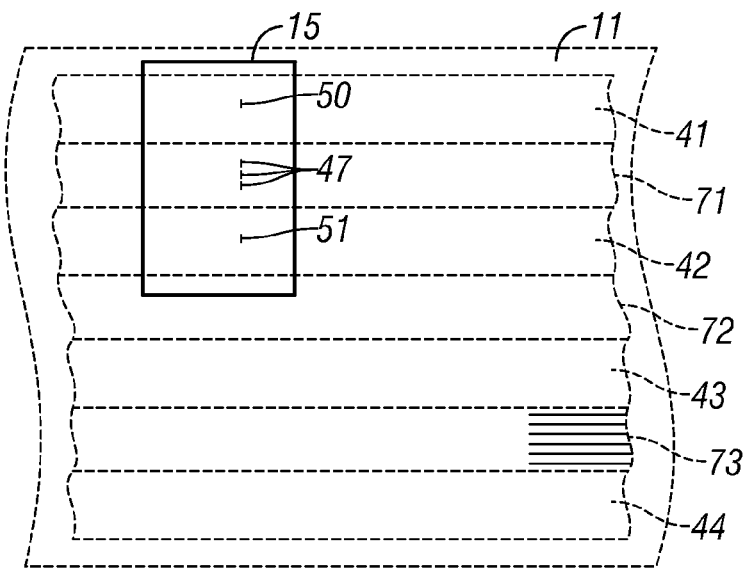
FIG. 3 is a schematic representation of a magnetic tape head and a segment of magnetic tape media with servo and data bands.

Referring additionally to FIG. 3, the magnetic tape head 15 comprises a plurality of read and write elements 47 for reading and writing data with respect to the magnetic tape media 11, for example comprising data bands 71, 72, 73. Although illustrated as single elements 47, the read and write elements of the head may comprise individual elements spaced slightly in the longitudinal direction of the magnetic tape media. This spacing may allow a read element that follows a write element to conduct a "read-after-write" to insure that the data has been correctly recorded during a write operation. A typical magnetic tape data storage drive operates in both the forward and reverse directions to read and write data. Thus, the magnetic tape head 15 may comprise one set of read and write elements 47 for operating in the forward direction and another set for operating in the reverse direction, or alternatively, may have two sets of the read elements on either side of the write elements to allow the same write elements to write in both directions while the two sets of read elements allow a read-after-write in both directions.

The magnetic tape media 11 has a plurality of longitudinal servo bands 41, 42, 43, 44 separated by the data bands 71, 72, 73. The numbers of servo and data bands may vary from those depicted in FIG. 3. The magnetic tape head also comprises two servo sensors 50, 51 located at either side of the read and write elements 47 for sensing servo bands 41, 42, 43, 44. The servo sensors are configured to sense two of the servo bands, each at opposite sides of a data band. A data band 71, 72, 73 comprises a number of parallel tracks, each of which corresponds to a read and a write element of the magnetic tape head 15. The tracks may be arranged in a back and forth serpentine pattern, each set of tracks called a "wrap", or may be arranged as sets of tracks which may be read or written in both directions. The magnetic tape media 11 may be moved in a first (or forward) direction from the supply reel 12 to the take up reel 14 while the track following servo follows one wrap or set of tracks, and then the servo and wrap control 27 may operate the actuator 17 to shift the magnetic tape head 15 laterally to another wrap or set of tracks, while staying in the same data band, and the magnetic tape media is moved in the opposite (or reverse) direction from the take up reel 14 to the supply reel 12 while the track following servo follows the other wrap or set of tracks.

The magnetic tape data storage drive 10 comprises one or more controls 20 for operating the magnetic tape data storage drive in accordance with commands received from an external system 30 received at an interface 21. The external system 30 may comprise a network, a host system, a data storage library or automation system, a data storage subsystem, etc., as is known to those of skill in the art. A control typically comprises logic and/or one or more microprocessors with a memory 19 for storing information and program information for operating the microprocessor(s) and drive. The program information may be supplied to the memory via the interface 21, by an input to the control 20 such as a floppy or optical disk, or by reading from a magnetic tape cartridge, or by any other suitable means. The magnetic tape data storage drive 10 may comprise a standalone unit or comprise a part of a tape library or other subsystem, which may comprise the external system 30. The control 20 also provides the data flow and formatter for data to be read from and written to the magnetic tape media, employing a buffer 31 and a recording channel 32, as is known to those of skill in the art.

Figure 4:
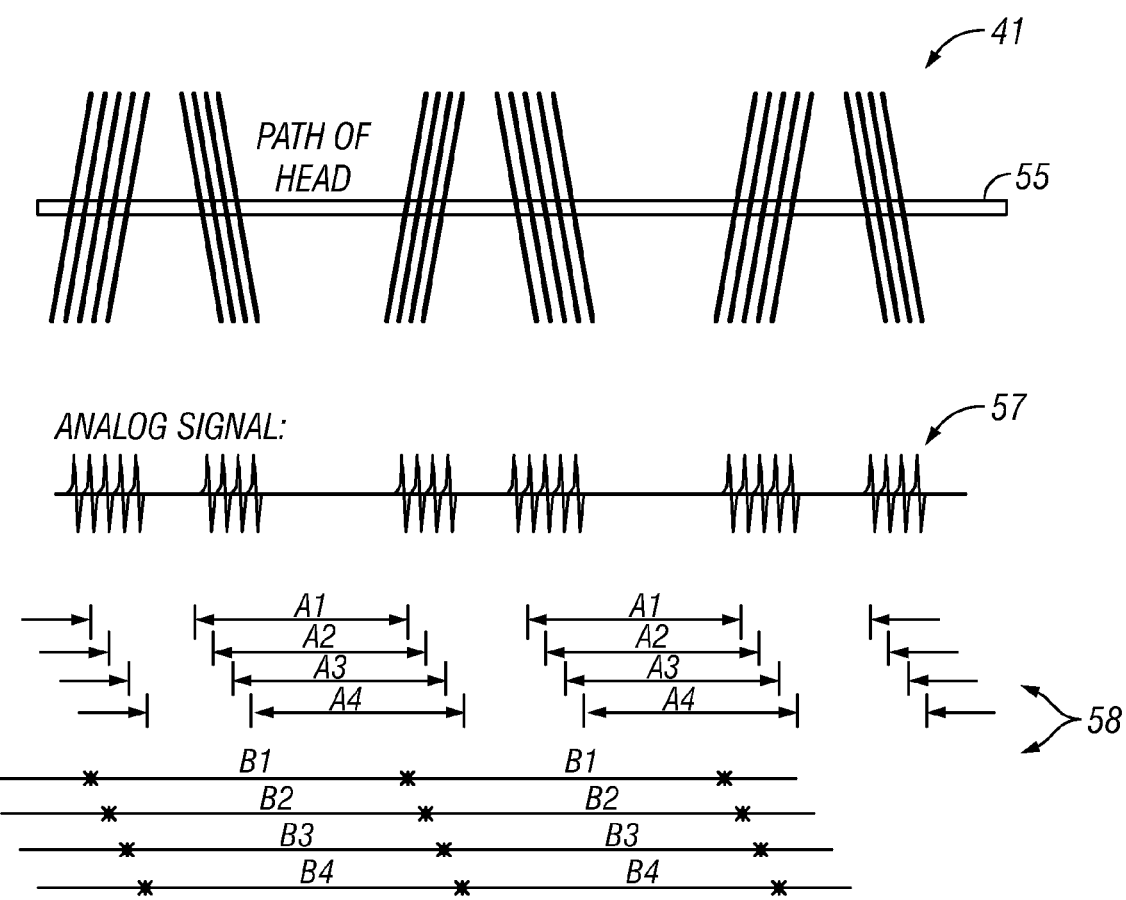
FIG. 4 is a representation of a narrow servo head as it tracks a timing based servo example of servo bands of FIG. 3, along with an idealized version of the signals produced by the servo head.

FIG. 4 illustrates one example of a timing based servo pattern written to a magnetic tape media, as is known to those of skill in the art. A servo sensor path 55 is illustrated which traces the servo sensor as it tracks one of the servo bands of FIG. 3, along with a representation of the generated servo output signal 57 and the corresponding signal intervals 58. The exemplary servo band is of the timing based servo type described in the incorporated U.S. Pat. No. 5,689,384 patent, which comprises patterns of non-parallel laterally extending transitions recorded across the width of the servo band. The timing 58 of the signal 57 derived from reading at any point across the width of such a pattern varies continuously as the servo sensor 50, 51 of FIG. 3 is moved laterally across the servo band, since the servo sensor 50, 51 is small compared to the width of the servo pattern.

Lateral position sensing is achieved by deriving a ratio of two servo pattern intervals "A" and "B" of FIG. 4 to allow for track following for each of a number of paths across the servo band. Timing based servo systems compare the time between peaks of the servo signal to derive the servo lateral position. The servo sensors 50, 51 are located at either side of the read and write elements 47 for sensing servo bands 41, 42, 43, 44. The servo sensors are configured to sense two of the servo bands, each at opposite sides of a data band.

Figure 5:
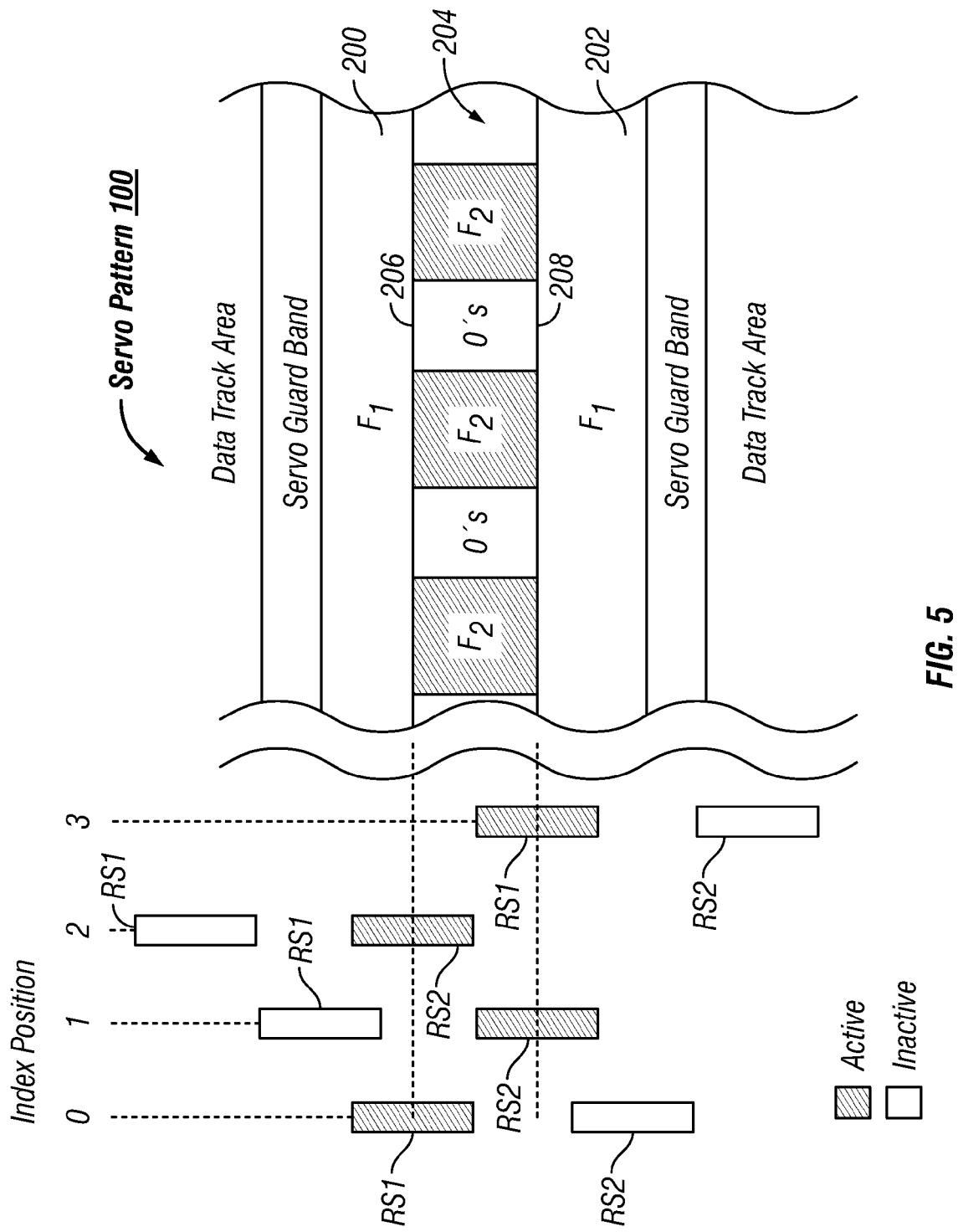
FIG. 5 is a representation of a multi-frequency servo pattern and various positions of a wide servo head as it tracks various index positions of the pattern.
Figure 6:
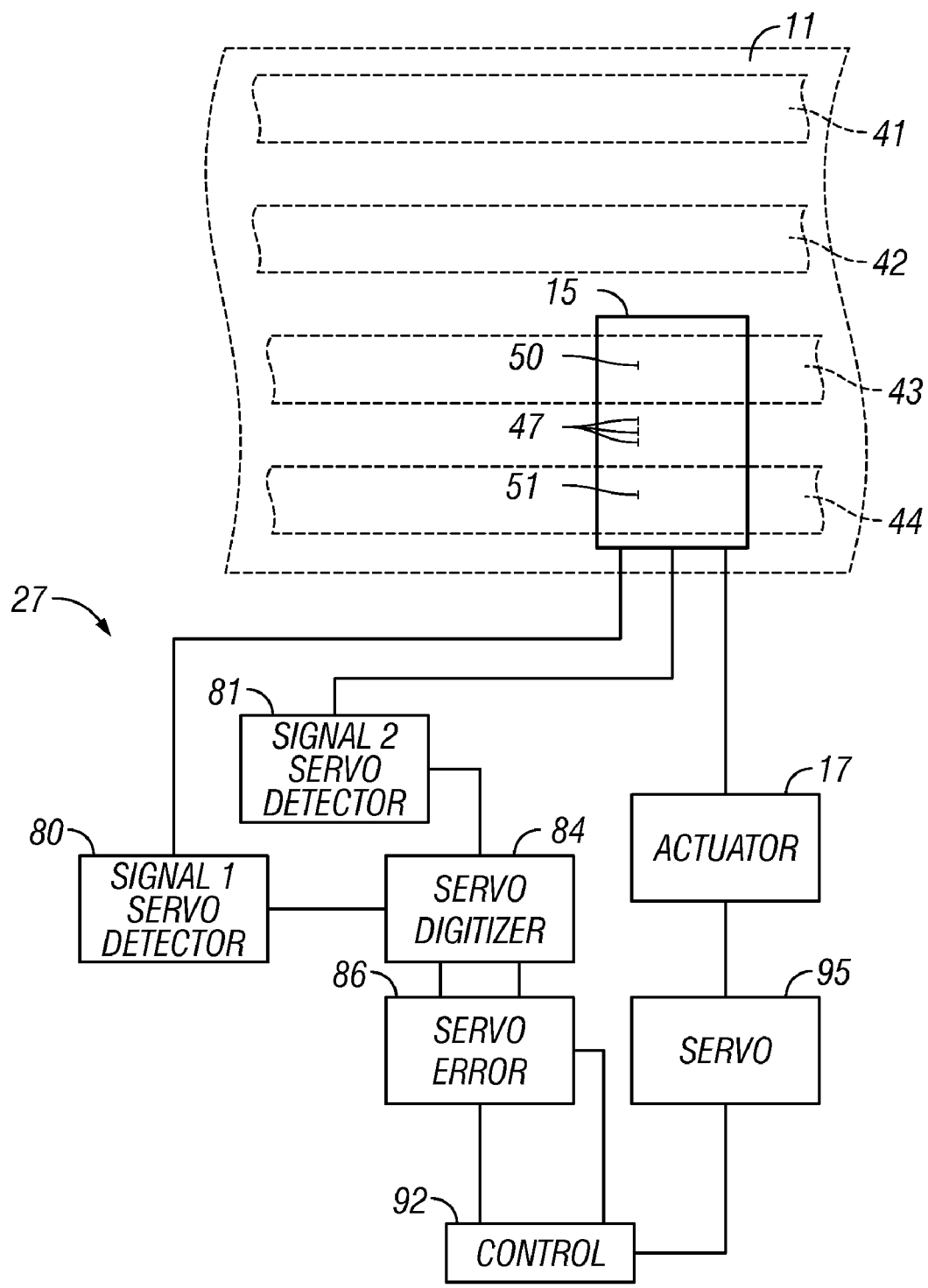
FIG. 6 is a schematic and block representation of servo read heads and servo reader, for reading servo information of a plurality of separate servo bands on a magnetic tape media.

FIG. 5 illustrates one example of a multi-frequency servo pattern written to a magnetic tape media, as is known to those of skill in the art. A servo pattern 100 comprises two outer tracks 200 and 202 of a first servo pattern of one frequency F1, and a middle track 204 having a different recorded servo pattern of a second frequency F2. The two boundaries between the F1 and F2 regions provide servo pattern edges. The exemplary servo band is of the multi-frequency type described in the incorporated U.S. Pat. No. 6,903,895 patent.

Lateral position sensing is derived from the relative amplitudes detected from an outer track and the middle track, since the servo read head, comprising two servo read elements RS1 and RS2, is wide and is able to read both tracks simultaneously. The tracking positions of the servo read elements are at the servo pattern edges 206 and 208, where the relative amplitudes of the two frequencies or patterns are equal. Various index positions are illustrated using binary logic of the positioning of the two servo read elements RS1 and RS2. The two servo read elements together comprise a single one of the servo sensors 50, 51 located at either side of the read and write elements 47 for sensing servo bands 41, 42, 43, 44. The servo sensors are configured to sense two of the servo bands, each at opposite sides of a data band.

Referring to FIGS. 1, 2, 3 and 6, the lateral positioning of the tape head is accomplished by actuator 17, which may have mechanical or electromechanical components. Once the proper lateral positioning of the tape head has been accomplished to the correct path, minor adjustments of the head to follow the particular path within the servo band is made by lateral movement of the tape head with respect to the tape. Similarly, lateral repositioning of the tape head to different sets of tracks or wraps is accomplished by an adjustment of position within the servo band to another path or index position, or movement to another set of servo bands. The number of servo bands may vary from those depicted in FIGS. 3 and 6.

The servo signals are detected by servo detectors 80, 81 of servo system 27, respectively detecting servo read heads and digitized by servo digitizer 84.

In accordance with the present invention, servo error detector 86 detects an error for either or both of the servo sensors 50, 51 located at either side of the read and write elements 47, and identifies which sensor is in error. The error that is most likely to be detected in accordance with the invention is a failure to acquire or to read the servo signal, meaning, for example, that the signal of the servo sensor 50, 51 is below a threshold value.

As discussed above, after repeated usage of the very thin magnetic tape media, the edge of tape can become weakened and slightly stressed. When this happens the edge of the tape can become slightly stretched or worn, and may affect the readability of the servo and data tracks near the edge, for example by moving a distance away from the tape head near the edge. The amplitude of the signal is related to the distance of the tape from the tape head, and, if the tape is not close to the head, the signal is of insufficient strength to be detected properly.

The servo error detector supplies the servo signals to a control 92, indicating which of the servo signals is "valid". If there is no error, both servo signals from both of the servo sensors 50, 51 is indicated as being valid.

If there is a servo detection error, the servo error detector 86 signals the control 92 of the error by the absence of a valid signal. Alternatively, the servo error detector provides a specific error signal. Either case herein is termed a "servo detection error signal".

The control 92 employs valid servo signals and input positioning signals to operate a servo driver 95 to in turn operate actuator 17 to position the magnetic tape head 15 laterally of the magnetic tape.

Figure 7:
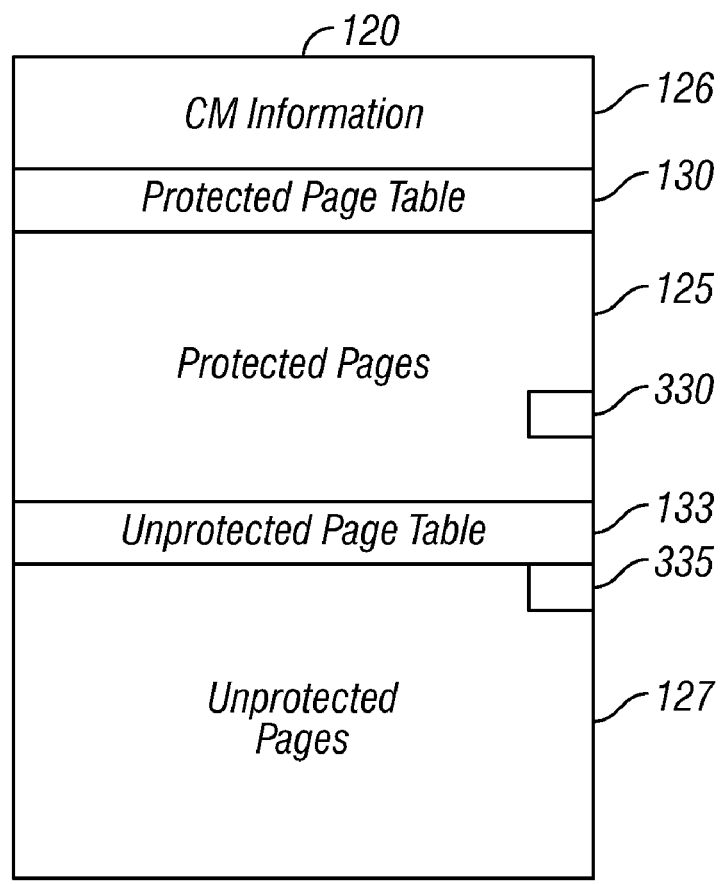
FIG. 7 is a schematic representation of a cartridge memory of the magnetic tape data storage cartridge of FIG. 1.

Referring to FIG. 7, an example of the content 120 of a cartridge memory 29 of FIG. 2 is illustrated. One example of a cartridge memory and its content is described in Standard ECMA-319, June 2001. "Data Interchange on 12, 7 mm 384-Track Magnetic Tape Cartridges—Ultrium-1 Format", Annex D—LTO Cartridge Memory, pp. 95-115. The cartridge memory 29 and transponder 35 of FIG. 2 may be similar to the memory and transponder used in "smart Cards" as are known to those of skill in the art.

In the embodiment of FIG. 7, the content 120 of the cartridge memory is arranged in areas of various sizes with information organized into "sections". The specific layout of the content and the terminology used may be altered as is known to those of skill in the art. Herein, the sections may be divided into subsections or "pages", one or more of which may contain special subareas or even special individual bits of information.

Certain pages of the cartridge memory, such as in section 125 are originally writable and may be read, but are lockable to read-only to become protected pages. For example, a write inhibit code may be written to lock section 125, and the location of that code may be in section 125 so that the lock itself is locked.

Section 126 comprises information provided for or by the manufacturer of the cartridge memory.

Section 127 comprises pages that are unprotected and may be writable at any time.

Section 130 comprises a table describing the content of sections 125 and 126 and is also protectable.

Section 133 comprises a table describing the content of section 127, and may be constantly updated to track updates to the unprotected pages of section 127.

Referring to FIGS. 1, 2, 6, 7 and 8, in one embodiment, a read and/or write operation may be conducted by magnetic tape data storage drive 10 with respect to a magnetic tape data storage cartridge 13 in step 300, after the cartridge has been loaded into the drive. As part of the read and/or write operation, in step 305, the servo system 27 senses two servo bands, each at opposite sides of a data band, with servo sensors 50, 51 located at either side of the read and write elements 47.

Step 308 represents the operation of servo error detector 86 to detect an error for either or both of the servo sensors 50, 51 located at either side of the read and write elements 47, and identifies which sensor is in error, for example, identifying the servo signal as invalid. The error that is most likely to be detected in accordance with the invention is a failure to acquire or to read the servo signal, meaning, for example, that the signal of the servo sensor 50, 51 is undetectable or below a threshold value.

If in step 308, the servo signals are valid, indicating that the servo signals were successfully detected, the operation continues in step 310.

Step 308, in one embodiment, comprises the detection of a servo detection error regarding either of the two servo bands by sensors 50, 51 of the sensing step. In an alternative embodiment, step 308 may respond to the detection of a servo detection error regarding only the bottom servo band, for example, by sensor 51. Still alternatively, the sensing step 305 may comprise sensing only the bottom servo band for servo detection error signals in step 308.

Figure 8:
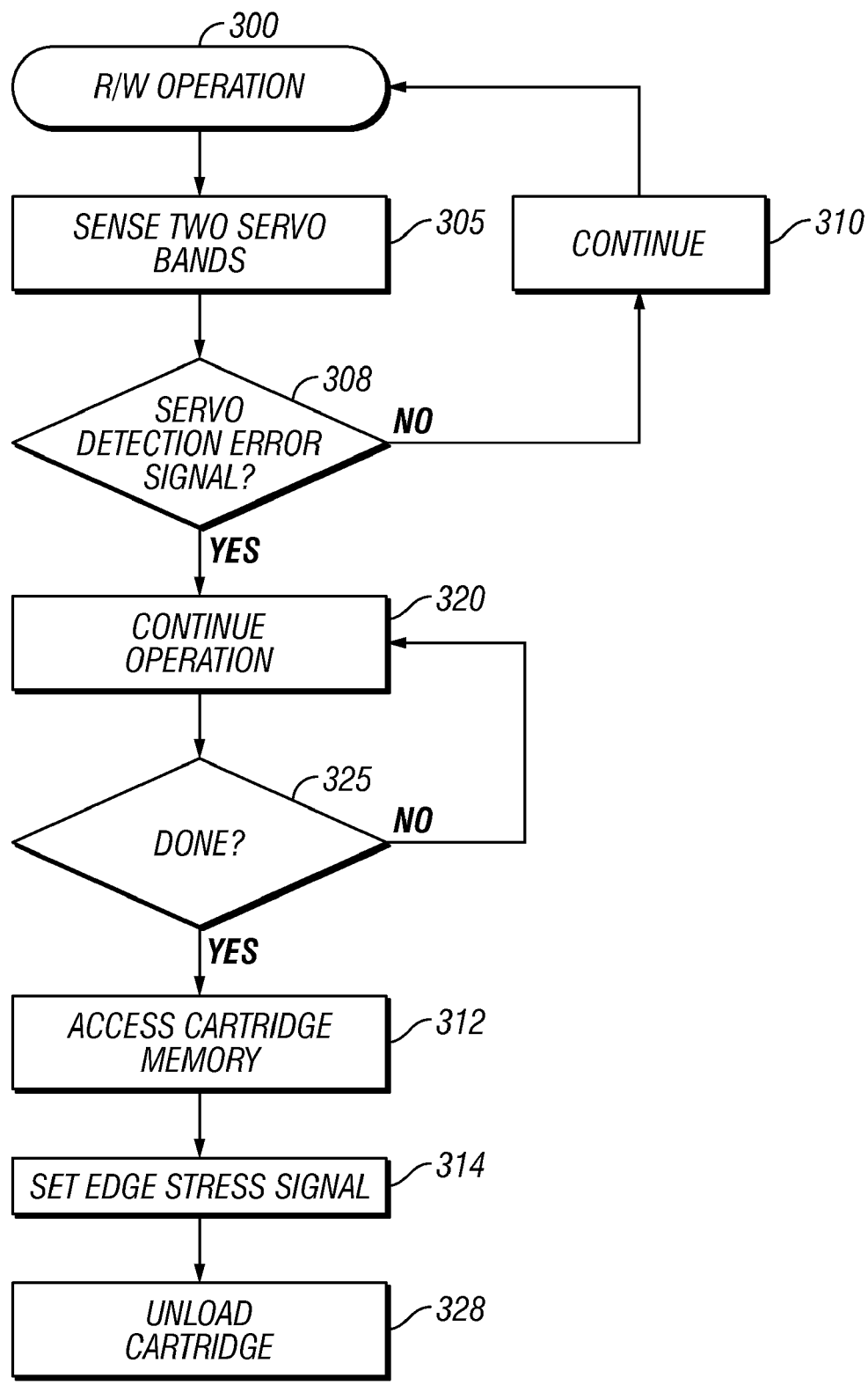
FIG. 8 is a flow chart depicting a method in accordance with embodiments of the present invention.
Figure 9:
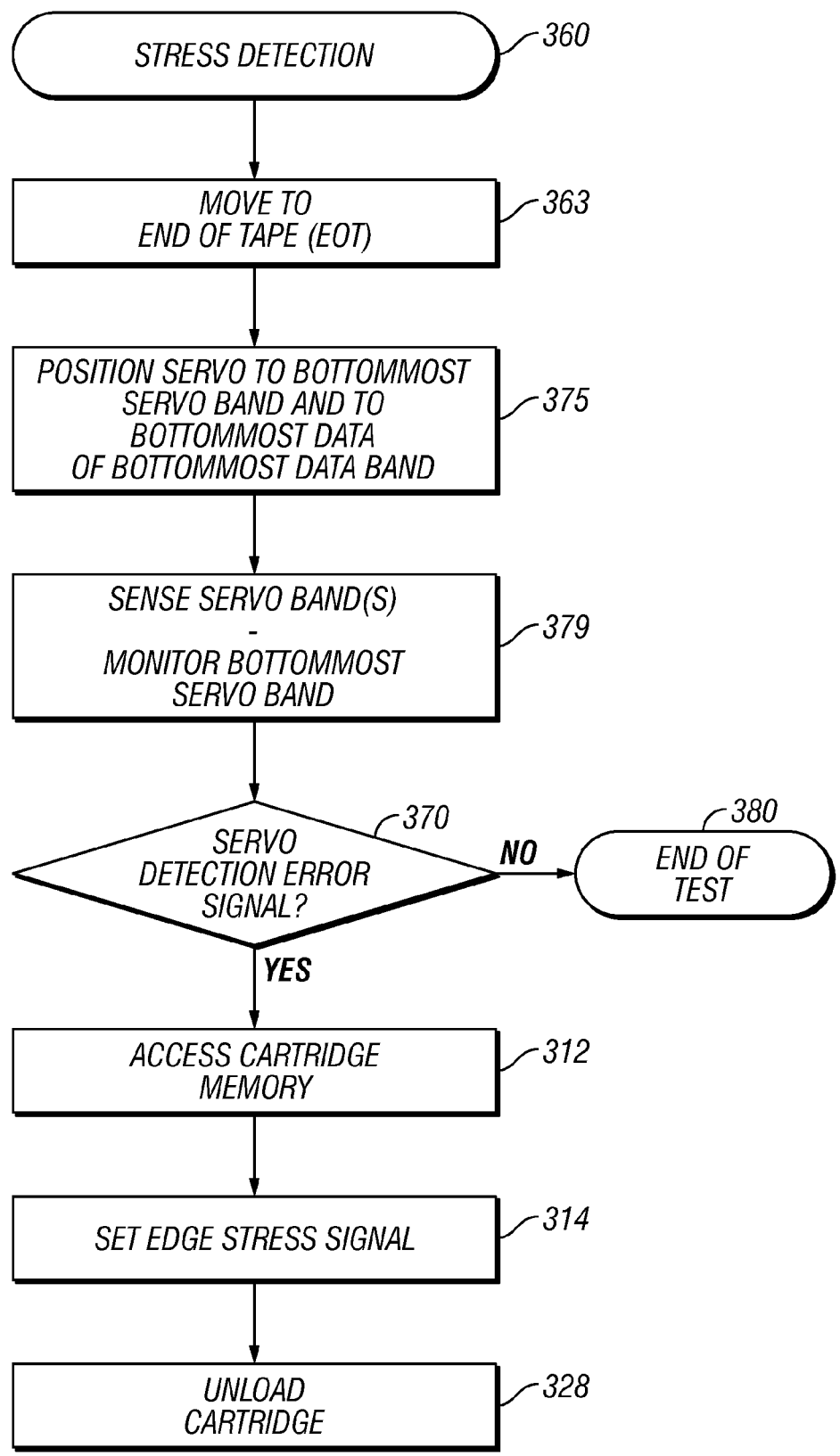
FIG. 9 is a flow chart depicting an alternative method in accordance with embodiments of the present invention.
Figure 10:
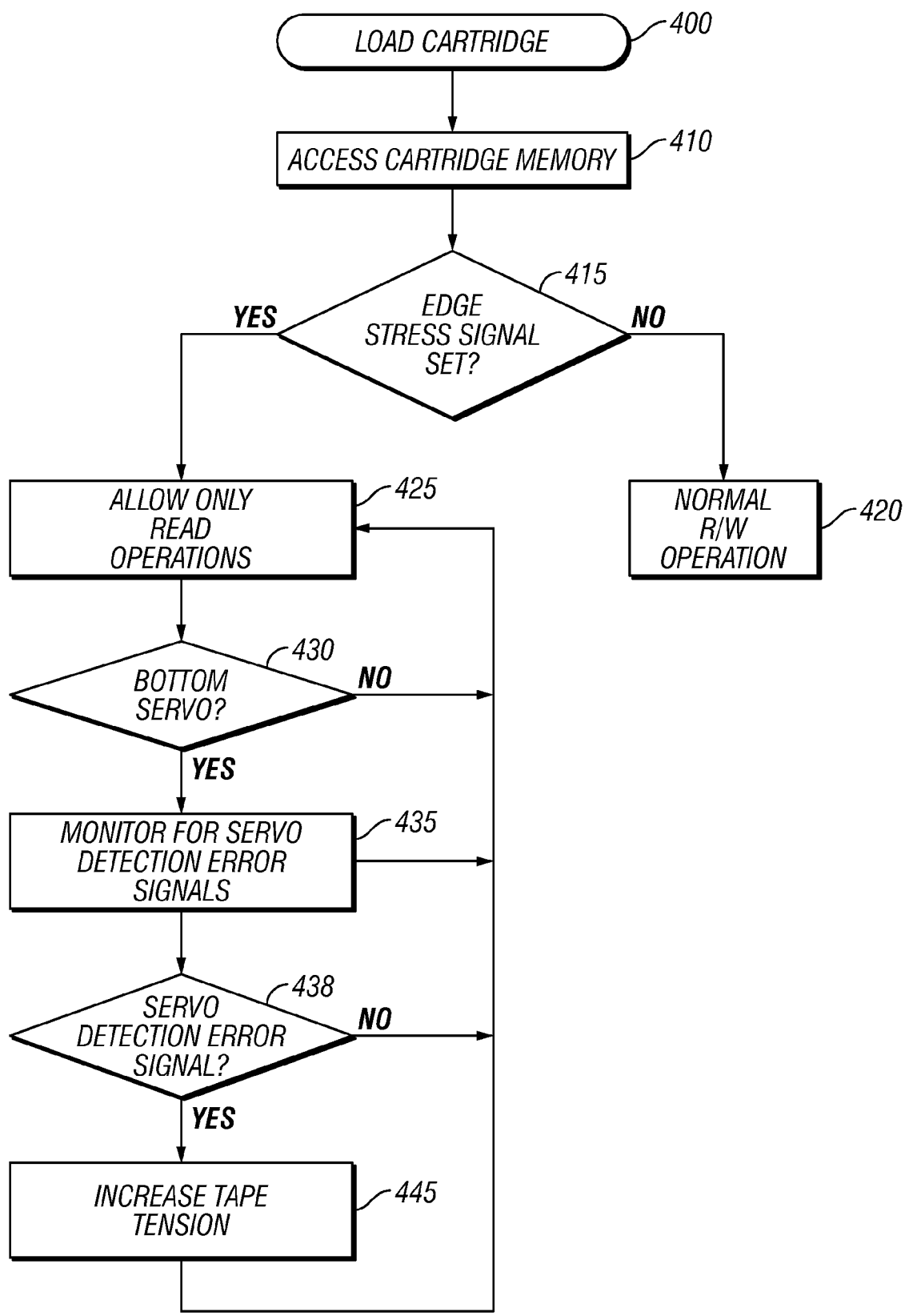
FIG. 10 is a flow chart depicting a method in accordance with further embodiments of the present invention.

If in step 308, one of the servo signals or the bottom servo signal is invalid, comprising a servo detection error signal, in response, the edge stress signal will be set in the cartridge memory 29 of the magnetic tape data storage cartridge 13. In many magnetic tape data storage drives, the cartridge memory 29 is accessed only after the operations of the drive with respect to the cartridge are complete and the cartridge is to be unloaded. The specific steps of the embodiment of FIG. 8 are organized in view of this sequence. Alternatively, the edge stress signal may be set in the cartridge memory 29 immediately or during the operations of the magnetic tape drive 10, in steps 312 and 314. In order to be accomplished during the operation of the magnetic tape drive 10, the control 20 operates the servo and wrap control 27, the motor drivers 28, the recording channel 32 and the transponder 35 simultaneously, or nearly so. The control accesses the cartridge memory 29 via the transponder in step 312, addressing the content 120 either at area 330 in the protected pages (if the pages of the cartridge memory in section 125 have not been locked to read-only to become protected pages), or at area 335 in the unprotected pages. The locations 330 or 335 are defined in the associated page tables 130 or 133. In step 314, the control sets the edge stress signal at the appropriate area 330 or 335.

To accommodate accessing the cartridge memory subsequent to completion of the operations of the drive with respect to the cartridge, after the servo control 27 provides a servo detection error signal in step 308, the operations of the magnetic tape data storage drive continue in step 320. In many drives, a read operation continues with only one servo signal being valid, but a write operation may be stopped and abended or retried. Other write operations may then be conducted, for example, with respect to other data bands. In step 325, the controller determines whether the operations of the magnetic tape data storage drive with respect to the cartridge 13 have completed. If not, the operations continue.

When step 325 indicates that the operations have all completed, the control 20 accesses the cartridge memory 29 via the transponder in step 312, addressing the content 120 either at area 330 in the protected pages, or at area 335 in the unprotected pages. The locations 330 or 335 are defined in the associated page tables 130 or 133. In step 314, the control sets the edge stress signal at the appropriate area 330 or 335, and unloads the cartridge 13 in step 328.

Thus, in response to the servo detection error signal of one of the two servo bands of the sensing step, an edge stress signal is set to the accompanying cartridge memory 29 of the magnetic tape data storage cartridge 13.

Referring to FIGS. 1, 2, 6, 7 and 9, in another embodiment, beginning at step 360, the control 20, in step 363, operates the motor drivers 28 to move magnetic tape data storage media 11 to the end of tape, for example, to test the magnetic tape media. The end of tape is the location on the tape that is closest to the supply reel and is subject to the greatest stress. Thus, the test is more likely to produce a servo detection error signal in step 370 at that location as compared to the rest of the tape. In one embodiment, the test may be conducted with respect to any two servo bands. In another embodiment, the test is conducted with respect to the bottom servo band, e.g. by servo sensor 51. In still another embodiment, the control, in step 375, operates the servo and wrap control 27 to position the head 15 to allow detection of the bottommost data of the bottom data band. In step 379, either both servo bands at either side of the data bands are sensed by sensors 50 and 51, or alternatively, only the bottom servo sensor 51 senses the bottommost servo position of the bottom servo band, e.g. servo band 44, and the bottom servo band is monitored by servo error detector 86 to detect an error for servo sensor 51 located at the bottom side of the read and write elements 47, and identifies that sensor 51 is in error in step 370. The error that is most likely to be detected in accordance with the invention is a failure to acquire or to read the servo signal, meaning, for example, that the signal of the servo sensor 51 is below a threshold value.

If, in step 370, no servo detection error is found, the test ends in step 380.

If step 370 indicates a servo detection error, the control 20 accesses the cartridge memory 29 via the transponder in step 312, addressing the content 120 either at area 330 in the protected pages, or at area 335 in the unprotected pages. The locations 330 or 335 are defined in the associated page tables 130 or 133. In step 314, the control sets the edge stress signal at the appropriate area 330 or 335, and unloads the cartridge 13 in step 328.

Thus, the magnetic tape data storage cartridge memory 29, at a storage location configured to store any set edge stress signal, the edge stress signal indicates at least one sensed servo detection error signal of one of two servo bands, the servo bands each at opposite sides of a data band, of the elongate magnetic tape data storage media.

Referring to FIGS. 1, 2, 7 and 10, in one embodiment, beginning at step 400, a magnetic tape data storage cartridge 13 is loaded or reloaded into the magnetic tape data storage drive 10.

In step 410, the control 20 accesses the cartridge memory 29 via the transponder, addressing the content 120 either at area 330 in the protected pages, or at area 335 in the unprotected pages to inspect the edge stress signal location. The locations 330 or 335 are defined in the associated page tables 130 or 133. In step 415, the control determines whether the edge stress signal is set.

If the edge stress signal is not set in the cartridge memory, both normal read and write operations, etc., are allowed by the control with respect to the inspected cartridge 13, in step 420.

If the edge stress signal is set, in step 425, normal write operations are prevented such that only read operations are allowed with respect to the inspected magnetic tape data storage cartridge 13 by the control 20. Herein, "only read operations are allowed" of step 425 or similar terminology is in the context of normal read and write operations. Other operations may occur in addition to or instead of normal read operations in the presence of or triggered by detection of a set edge stress signal. In one embodiment, detection of a set edge stress signal in cartridge memory 29 causes the control 20 to generate a tape alert to notify the host system 30 of a possible degraded media condition.

In another embodiment, if the edge stress signal is set, in step 430, the drive detects whether the bottom servo band is being sensed, and, if so, in step 435, the control monitors at least the bottom servo sensor 51, and, in step 438, determines whether there is a servo detection error signal. In step 445, the control responds to at least one servo detection error signal of the sensed bottom servo band to operate motor drivers 28 and control the relative torque of each of the motors 16 to increase tension of the magnetic tape data storage media 11 during reading of a bottom data band.

The invention can take the form of an entirely hardware embodiment, or an embodiment containing both hardware and software elements to operate the magnetic tape data storage drive 10.

Furthermore, the method of the invention can take the form of a computer program product stored on and accessible from a computer usable or computer readable medium providing program code for use by or in connection with a computer or any instruction execution system. For the purposes of this description, a computer usable or computer readable medium can be any apparatus that can contain, or store the program for use by or in connection with the instruction execution system, apparatus, or device.

The storage medium can be an electronic, magnetic, optical, electromagnetic, infrared, or semiconductor system (or apparatus or device). Examples of a computer readable medium, such as memory 19 include a semiconductor or solid state memory, magnetic tape, a removable computer diskette, and random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 20 coupled directly or indirectly to memory elements 19 through a system bus.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for operating a magnetic tape data storage system, said system comprising at least one magnetic tape data storage drive configured to handle at least one magnetic tape data storage cartridge comprising a magnetic tape data storage media and accompanying cartridge memory, said magnetic tape data storage media comprising a plurality of servo bands extending in a longitudinal direction of said magnetic tape data storage media, said servo bands separated by data bands, comprising the steps of:

sensing two said servo bands, each at opposite sides of a data band, of said magnetic tape data storage media of a magnetic tape data storage cartridge;

responding to at least one servo detection error signal of one of said two servo bands of said sensing step, to set an edge stress signal to said accompanying cartridge memory of said magnetic tape data storage cartridge;

inspecting a cartridge memory of a magnetic tape data storage cartridge for a set said edge stress signal; and if said edge stress signal is set, preventing normal write operations such that only read operations are allowed with respect to said inspected magnetic tape data storage cartridge.

2. The method of claim 1, wherein said inspecting step is conducted subsequent to unloading and reloading said magnetic tape data storage cartridge in said magnetic tape data storage drive.

3. The method of claim 2, additionally comprising the steps of:

if said edge stress signal is set, detecting whether a bottom said servo band is being sensed, and, if so, responding to at least one servo detection error signal of said sensed bottom servo band to increase tension of said magnetic tape data storage media during reading of a bottom data band.

4. A method for operating a magnetic tape data storage system, said system comprising at least one magnetic tape data storage drive configured to handle at least one magnetic tape data storage cartridge comprising a magnetic tape data storage media and accompanying cartridge memory, said magnetic tape data storage media comprising a plurality of servo bands extending in a longitudinal direction of said magnetic tape data storage media, said servo bands separated by data bands, comprising the steps of:

inspecting a cartridge memory of a magnetic tape data storage cartridge for a set edge stress signal, said edge stress signal indicating at least one sensed servo detection error signal of one of two servo bands, said two servo bands each at opposite sides of a data band, of said magnetic tape data storage media of a magnetic tape data storage cartridge;

if said edge stress signal is set, preventing normal write operations such that only read operations are allowed with respect to said inspected magnetic tape data storage cartridge; and if no said edge stress signal is set, allowing both read and write operations with respect to said inspected magnetic tape data storage cartridge.

5. A method for operating a magnetic tape data storage system, said system comprising at least one magnetic tape data storage drive configured to handle at least one magnetic tape data storage cartridge comprising a magnetic tape data storage media and accompanying cartridge memory, said magnetic tape data storage media comprising a plurality of servo bands extending in a longitudinal direction of said magnetic tape data storage media, said servo bands separated by data bands, comprising the steps of:

during operation of said magnetic tape data storage system with respect to a magnetic tape data storage media of a magnetic tape data storage cartridge, sensing two said servo bands, each at opposite sides of a data band, of said magnetic tape data storage media; and responding to at least one servo detection error signal of one of said two servo bands of said sensing step, to set an edge stress signal to said accompanying cartridge memory of said magnetic tape data storage cartridge.

6. The method of claim 5, wherein:

as a part of said sensing step, sensing the bottom said servo band for servo detection error signals as said one of said two servo bands; and as a part of said responding step, responding to said at least one servo detection error signal of said bottom said servo band of said sensing step, to set said edge stress signal.

7. The method of claim 6, additionally comprising moving said magnetic tape data storage media to the end of tape, and positioning a servo of said magnetic tape data storage drive to a position to allow detection of the bottommost data of the bottom said data band, to sense the bottommost servo position of said bottom servo band.

8. A magnetic tape data storage drive comprising:

at least one read/write head configured to read and/or write data with respect to magnetic tape data storage media;

at least one servo system configured to provide servo signals derived from servo bands extending in a longitudinal direction of said magnetic tape data storage media, said servo bands separated by data bands, to respond to said servo signals to control the lateral positioning of said at least one read/write head based on said servo signals, and to sense errors of said servo band;

a magnetic tape drive system configured to move said magnetic tape data storage media in said longitudinal direction past said at least one read/write head and said at least one servo system;

cartridge communication interface configured to communicate with respect to a cartridge memory of a magnetic tape data storage cartridge; and control apparatus configured to:

sense two said servo bands, each at opposite sides of a data band, of said magnetic tape data storage media of a magnetic tape data storage cartridge;

respond to at least one servo detection error signal of one of said two sensed servo bands, to set, via said cartridge communication interface, an edge stress signal to said accompanying cartridge memory of said magnetic tape data storage cartridge;

inspect, via said cartridge communication interface, a cartridge memory of a magnetic tape data storage cartridge for a set said edge stress signal; and if said edge stress signal is set, prevent normal write operations such that only read operations are allowed with respect to said inspected magnetic tape data storage cartridge.

9. The magnetic tape data storage drive of claim 8, wherein said control apparatus is configured to conduct said inspection subsequent to unloading and reloading said magnetic tape data storage cartridge in said magnetic tape data storage drive.

10. The magnetic tape data storage drive of claim 9, wherein said control apparatus additionally is configured to:

if said edge stress signal is set, detect whether a bottom said servo band is being sensed, and, if so, respond to at least one servo detection error signal of said sensed bottom servo band to increase tension of said magnetic tape data storage media during reading of a bottom data band.

11. A magnetic tape data storage drive comprising:

at least one read/write head configured to read and/or write data with respect to magnetic tape data storage media;

at least one servo system configured to provide servo signals derived from servo bands extending in a longitudinal direction of said magnetic tape data storage media, said servo bands separated by data bands, to respond to said servo signals to control the lateral positioning of said at least one read/write head based on said servo signals, and to sense errors of said servo band;

a magnetic tape drive system configured to move said magnetic tape data storage media past said at least one read/write head and said at least one servo system;

cartridge communication interface configured to communicate with respect to a cartridge memory of a magnetic tape data storage cartridge; and control apparatus configured to:

inspect, via said cartridge communication interface, a cartridge memory of a magnetic tape data storage cartridge for a set edge stress signal, said edge stress signal indicating at least one sensed servo detection error signal of one of two servo bands, each at opposite sides of a data band, of said magnetic tape data storage media of a magnetic tape data storage cartridge;

if said edge stress signal is set, prevent normal write operations such that only read operations are allowed with respect to said inspected magnetic tape data storage cartridge; and if no said edge stress signal is set, allow both read and write operations with respect to said inspected magnetic tape data storage cartridge.

12. A magnetic tape data storage drive comprising:

at least one read/write head configured to read and/or write data with respect to magnetic tape data storage media;

at least one servo system configured to provide servo signals derived from servo bands extending in a longitudinal direction of said magnetic tape data storage media, said servo bands separated by data bands, to respond to said servo signals to control the lateral positioning of said at least one read/write head based on said servo signals, and to sense errors of said servo bands;

a magnetic tape drive system configured to move said magnetic tape data storage media past said at least one read/write head and said at least one servo system;

cartridge communication interface configured to communicate with respect to a cartridge memory of a magnetic tape data storage cartridge; and control apparatus configured to:

during operation of said magnetic tape data storage drive with respect to a magnetic tape data storage media of a magnetic tape data storage cartridge, sense two said servo bands, each at opposite sides of a data band; and respond to at least one servo detection error signal of one of said two sensed servo bands, to set an edge stress signal to said accompanying cartridge memory of said magnetic tape data storage cartridge.

13. The magnetic tape data storage drive of claim 12, wherein said control apparatus is configured to:

as a part of said sensing of said two servo bands, sense the bottom said servo band for servo detection error signals; and as a part of said responding to said at least one servo detection error signal, respond to at least one said servo detection error signal of said bottom servo band to set said edge stress signal.

14. The magnetic tape data storage drive of claim 13, wherein said control apparatus is configured to additionally move said magnetic tape data storage media in said longitudinal direction to the end of tape, and position a servo of said servo system to a position to allow detection of the bottommost data of the bottom said data band, to sense the bottommost servo position of said bottom servo band.

15. A data storage system comprising:
a cartridge communication interface configured to communicate with respect to a cartridge memory of a magnetic tape data storage cartridge; and
a magnetic tape data storage drive comprising:
at least one read/write head configured to read and/or write data with respect to magnetic tape data storage media;
at least one servo system configured to provide servo signals derived from servo bands extending in a longitudinal direction of said magnetic tape data storage media, said servo bands separated by data bands, to respond to said servo signals to control the lateral positioning of said at least one read/write head based on said servo signals, and to sense errors of said servo band;
a magnetic tape drive system configured to move said magnetic tape data storage media past said at least one read/write head and said at least one servo system;
memory communication interface configured to communicate with respect to said cartridge communication interface; and
control apparatus configured to:
sense two said servo bands, each at opposite sides of a data band, of said magnetic tape data storage media of a magnetic tape data storage cartridge;
respond to at least one servo detection error signal of one of said two sensed servo bands, to communicate with said cartridge communication interface via said memory communication interface to set an edge stress signal to an accompanying cartridge memory of said magnetic tape data storage cartridge;
communicate with said cartridge communication interface via said memory communication interface to inspect a cartridge memory of a magnetic tape data storage cartridge for a set said edge stress signal; and
if said edge stress signal is set, prevent normal write operations such that only read operations are allowed with respect to said inspected magnetic tape data storage cartridge.

16. The data storage system of claim 15, wherein said magnetic tape data storage drive control apparatus is configured to conduct said inspection subsequent to unloading and reloading said magnetic tape data storage cartridge in said magnetic tape data storage drive.

17. The data storage system of claim 16, wherein said magnetic tape data storage drive control apparatus additionally is configured to:
if said edge stress signal is set, detect whether a bottom said servo band is being sensed, and, if so, respond to at least one servo detection error signal of said sensed bottom servo band to increase tension of said magnetic tape data storage media during reading of a bottom data band.

18. A data storage system comprising:
a cartridge communication interface configured to communicate with respect to a cartridge memory of a magnetic tape data storage cartridge; and
a magnetic tape data storage drive comprising:
at least one read/write head configured to read and/or write data with respect to magnetic tape data storage media;
at least one servo system configured to provide servo signals derived from servo bands extending in a longitudinal direction of said magnetic tape data storage media, said servo bands separated by data bands, to respond to said servo signals to control the lateral positioning of said at least one read/write head based on said servo signals, and to sense errors of said servo band;
a magnetic tape drive system configured to move said magnetic tape data storage media past said at least one read/write head and said at least one servo system;
memory communication interface configured to communicate with respect to said cartridge communication interface; and
control apparatus configured to:
communicate with said cartridge communication interface via said memory communication interface to inspect a cartridge memory of a magnetic tape data storage cartridge for a set said edge stress signal, said edge stress signal indicating at least one sensed servo detection error signal of one of two said servo bands, said two servo bands each at opposite sides of a data band, of said magnetic tape data storage media of a magnetic tape data storage cartridge;
if said edge stress signal is set, allow only read operations with respect to said inspected magnetic tape data storage cartridge; and
if no said edge stress signal is set, allow both read and write operations with respect to said inspected magnetic tape data storage cartridge; and
if said edge stress signal is set, prevent normal write operations such that only read operations are allowed with respect to said inspected magnetic tape data storage cartridge.

19. A data storage system comprising:
a cartridge communication interface configured to communicate with respect to a cartridge memory of a magnetic tape data storage cartridge; and
a magnetic tape data storage drive comprising:
at least one read/write head configured to read and/or write data with respect to magnetic tape data storage media;
at least one servo system configured to provide servo signals derived from servo bands extending in a longitudinal direction of said magnetic tape data storage media, said servo bands separated by data bands, to respond to said servo signals to control the lateral positioning of said at least one read/write head based on said servo signals, and to sense errors of said servo bands;
a magnetic tape drive system configured to move said magnetic tape data storage media past said at least one read/write head and said at least one servo system;
memory communication interface configured to communicate with respect to said cartridge communication interface; and
control apparatus configured to:
during operation of said magnetic tape data storage drive with respect to a magnetic tape data storage media of a magnetic tape data storage cartridge, sense two of said servo bands, each at opposite sides of a data band; and
respond to at least one servo detection error signal of one of said sensed two said servo bands, to communicate with said cartridge communication interface via said memory communication interface to set an edge stress signal to an accompanying cartridge memory of said magnetic tape data storage cartridge.

20. The data storage system of claim 19, wherein said magnetic tape data storage drive control apparatus is configured to:
as a part of said sensing of said two servo bands, sense the bottom said servo band for servo detection error signals; and
as a part of said responding to said at least one servo detection error signal, respond to at least one said servo detection error signal of said bottom servo band to set said edge stress signal.

21. The data storage system of claim 20, wherein said magnetic tape data storage drive control apparatus is configured to additionally move said magnetic tape data storage media in said longitudinal direction to the end of tape, and position a servo of said servo system to a position to allow detection of the bottommost data of the bottom said data band to sense the bottommost servo position of said bottom servo band.

22. A magnetic tape data storage cartridge, comprising:
an elongate magnetic tape data storage media having a plurality of servo bands extending in a longitudinal direction of said magnetic tape data storage media, said servo bands separated by data bands, said servo bands employed by a servo system of a magnetic tape to provide servo signals to control the lateral positioning of at least one read/write head based on said servo signals, and to sense errors of said servo bands; and
a cartridge memory comprising a storage location configured to store any set edge stress signal, said edge stress signal indicating at least one sensed servo detection error signal of one of two servo bands, each at opposite sides of a data band, of said elongate magnetic tape data storage media.

* * * * *